United States Patent
Koganezawa

(10) Patent No.: US 7,061,724 B2
(45) Date of Patent: Jun. 13, 2006

(54) DISC DRIVE MAGNETIC HEAD FINE POSITIONING MECHANISM INCLUDING A BASE CONNECTING A SUSPENSION TO AN ARM, AND HAVING A PIEZOELECTRIC DRIVE ELEMENT ADJACENT THERETO

(75) Inventor: Shinji Koganezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 10/254,735

(22) Filed: Sep. 24, 2002

(65) Prior Publication Data

US 2003/0142448 A1 Jul. 31, 2003

(30) Foreign Application Priority Data

Jan. 31, 2002 (JP) ........................ 2002-024597

(51) Int. Cl.
*G11B 5/58* (2006.01)
*G11B 5/55* (2006.01)

(52) U.S. Cl. .................. 360/294.4; 360/244.5
(58) Field of Classification Search .......... 360/294.1, 360/294.3, 294.4, 244.5
See application file for complete search history.

(56) References Cited

U.S. PATENT DOCUMENTS

| | | | |
|---|---|---|---|
| 6,233,124 B1 * | 5/2001 | Budde et al. ............ | 360/294.4 |
| 6,327,120 B1 | 12/2001 | Koganezawa et al. ... | 360/294.4 |
| 6,512,659 B1 * | 1/2003 | Hawwa et al. .......... | 360/294.6 |
| 6,515,834 B1 * | 2/2003 | Murphy ................... | 360/294.4 |
| 6,532,138 B1 * | 3/2003 | Koganezawa ............ | 360/294.4 |
| 6,542,337 B1 * | 4/2003 | Maikuma ................. | 360/294.4 |
| 6,552,878 B1 * | 4/2003 | Sato et al. ............... | 360/294.4 |
| 6,590,748 B1 * | 7/2003 | Murphy et al. .......... | 360/294.4 |
| 6,614,627 B1 * | 9/2003 | Shimizu et al. .......... | 360/294.4 |
| 6,624,982 B1 * | 9/2003 | Masuda et al. .......... | 360/294.4 |
| 6,653,761 B1 * | 11/2003 | Fujii et al. ................. | 310/333 |
| 2001/0033452 A1 | 10/2001 | Koganezawa et al. ... | 360/77.02 |

FOREIGN PATENT DOCUMENTS

| | | |
|---|---|---|
| JP | 2000-163896 | 6/2000 |
| JP | 2000-182341 | 6/2000 |
| JP | 2002-245643 | 8/2002 |

* cited by examiner

Primary Examiner—Jefferson Evans
(74) Attorney, Agent, or Firm—Greer, Burns & Crain, Ltd.

(57) ABSTRACT

A fine positioning mechanism is provided in a disc drive for driving a head that records data onto and reproduces data from a disc. The mechanism includes a base fixed to an arm and a suspension, the base connecting the suspension to the arm, the arm swinging around a rotary shaft, and the suspension supporting the head. A drive part is located above the base, for deforming the base, the drive part including a shear type piezoelectric element that is polarized in a direction orthogonal to a thickness direction of the piezoelectric element, and deforms top and bottom surfaces of the piezoelectric element perpendicular to the thickness direction when voltage is applied to the piezoelectric element in the thickness direction.

14 Claims, 6 Drawing Sheets

DISC DRIVE MAGNETIC HEAD FINE POSITIONING MECHANISM INCLUDING A BASE CONNECTING A SUSPENSION TO AN ARM, AND HAVING A PIEZOELECTRIC DRIVE ELEMENT ADJACENT THERETO

BACKGROUND OF THE INVENTION

The present invention relates generally to head drive mechanisms, and more particularly to a mechanism for fine tracking the position of a head. The present invention is suitable, for example, for a hard disc drive ("HDD") which has a plurality of magnetic discs.

Available electronic information content is explosively increasing with the recent rapid technology development, as in the Internet. Accordingly, smaller and larger-capacity magnetic disc drives, typified by HDDs, have been increasingly demanded to store such a large amount of information. The increased number of data tracks per unit length (or TPI: Track per Inch), that is, a narrow track width is essential to realize a smaller and larger-capacity HDD. In addition, the improved head positioning accuracy is also required for reading data onto and reproducing data from a narrow track.

A so-called micro-actuator has been proposed as an effective means for improving positioning accuracy, which includes, in addition to a conventional head actuator mechanism, means for fine positioning (or minutely moving) a head device (or a slider equipped with the head device or a suspension that supports the slider). The instant inventor proposed an actuator that uses shear of a piezoelectric element as one example of such micro-actuators in Japanese Laid-Open Patent Application No. 2001-43641. This actuator has a layered structure including a suspension that supports a head device, a hinge plate that deforms as the piezoelectric element shears, two pairs of piezoelectric elements and electrodes, an actuator base, and an arm that supports the actuator base. However, the conventional shear type piezoelectric actuator has the following disadvantages:

First, due to the layered structure, a tolerance of the actuator depends upon a dimension tolerance of each member, and necessarily varies widely. Therefore, the suspension's attachment dimension accuracy is poor, resulting in difficult mounting of plural discs and/or fluctuating spring pressure with which the slider contacts a disc. In addition, where each of a pair of piezoelectric elements has a different thickness, the suspension is likely to be fixed while inclined with respect to an arm attachment surface. The fluctuating spring pressure and inclined suspension can result in a head crash (i.e., damage to a disc) and lowered positioning accuracy.

Second, the conventional shear type piezoelectric actuator barely enlarges the minutely deformed amount (or stroke). For example, it is known that an actuator that uses a longitudinal effect of the piezoelectric element may enlarge the stroke, but it is difficult to layer the shear type element for manufacturing reasons and thus hard to provide a sufficiently large stroke. Access to a track beyond fine positioning requires driving by a voice coil motor, resulting in a low head positioning speed. A large stroke for fine tracking purposes shortens the time period necessary for settling (which is a setting operation to a target position in a head positioning operation), and effectively provides faster settling. Disadvantageously, a small fine tracking stroke is likely to be saturated under a strong disturbance, such as external vibrations, and cannot provide desired compensation.

SUMMARY OF THE INVENTION

Accordingly, it is a general object of the present invention to provide a novel and useful fine tracking mechanism in which the above disadvantages are eliminated.

It is another exemplary object of the present invention to provide a fine tracking mechanism that improves a suspension's attachment dimension accuracy.

Another exemplary object of the present invention is to provide a fine tracking mechanism having an increased stroke.

In order to achieve these and other objects, a fine tracking mechanism according to one aspect of the present invention, provided in a disc drive, for driving a head that records data onto and reproduces data from a disc includes a base fixed to an arm and a suspension, the base connecting the suspension to the arm. The arm swings around a rotary shaft, and the suspension supports a head. A drive part is located adjacent the base for deforming the base, the drive part including a shear type piezoelectric element that is polarized in a direction orthogonal to a thickness direction of the piezoelectric element. The drive part deforms top and bottom surfaces of the piezoelectric element perpendicular to the thickness direction when voltage is applied to the piezoelectric element in the thickness direction. The base in this fine tracking mechanism serves as a hinge plate, and reduces attachment tolerance of the suspension. The reduced distribution within the suspension's attachment tolerance means that the suspension may be attached with more precision close to its design value. Therefore, the elastic force, for example, as seen in a contact start stop system where a suspension applies a preset elastic force to a disc, more closely approaches the design value, preventing crash and improving positioning accuracy. The base that serves as a hinge plate contributes to the reduced number of components, low profile, and cost reduction of the fine tracking mechanism.

The drive part may be provided at a first side of the base, and the suspension may be provided at a second side of the base opposite to the first side. Since no drive part exists between the suspension and the base, the suspension's attachment tolerance depends only upon the thickness tolerance and flatness of the base, and is not subject to the additional dimension tolerance introduced by the drive part. As a result, the suspension's attachment tolerance may be further reduced.

The base may be parted into a fixed side and a mobile side, the fixed side being fixed relative to the arm, and the mobile side being deformable relative to the fixed side. The time tracking mechanism may further include two pairs of shear type piezoelectric elements for fine position of the suspension, one piezoelectric element in each pair being provided on the fixed side of the base, and the other in each pair being provided on the mobile side of the base. A pair of piezoelectric-element coupling plates connect two shear type piezoelectric elements in each pair to each other. This fine adjustment mechanism uses each pair of shear type piezoelectric elements and the piezoelectric-element coupling plate to double the suspension's moving amount (or stroke).

A fine tracking mechanism according to another aspect of the present invention, provided in a disc drive, for driving a head that records data onto and reproduces data from a disc includes a base that connects a suspension to an arm, the suspension supporting the head, and the arm swinging around a rotary shaft. Two pairs of shear type piezoelectric elements are provided for finely adjusting the suspension position, the shear type piezoelectric elements being polarized in a direction orthogonal to a thickness direction of the piezoelectric elements, and deforming top and bottom surfaces of the piezoelectric elements, perpendicular to the thickness direction when voltage is applied to the piezoelectric elements in the thickness direction. Each pair of shear type piezoelectric elements has a fixed piezoelectric element and a mobile piezoelectric element, and the fixed and mobile piezoelectric elements have opposite polarization directions. A pair of piezoelectric-element coupling plates connect the two shear type piezoelectric elements in each pair to each other. This fine tracking mechanism uses each pair of shear type piezoelectric elements and the piezoelectric-element coupling plate to double suspension's moving amount (or stroke).

An electrode layer may be formed on the base through an insulating layer, the electrode layer being used to apply voltage to the shear type piezoelectric element. In this manner, the distribution of the suspension's attachment tolerance may be reduced, in comparison with the conventional structure in which an additional electrode plate is formed as a separate member from the base and the suspension is provided above the electrode plate.

The base may be grounded. Since the base serves partially to apply voltage to the piezoelectric element, the suspension's attachment tolerance may be reduced in comparison with such a structure in which an additional electrode plat is formed as a separate member from the base.

The base may be grounded, desired voltage may be applied to the piezoelectric-element coupling plate, and two pairs of shear type piezoelectric elements may be bonded onto the base. Thereby, the suspension's attachment tolerance may be further reduced, in comparison with the conventional structure in which an additional electrode plate is formed as a separate member from the base and the suspension is provided above the electrode plate. In addition, in comparison with the above structure in which the electrode layer is formed on the base through the insulating layer, this invention provides the easier manufacture and cost reduction since it is unnecessary to form the insulating and electrode layers.

A pair of piezoelectric-element coupling plates may be connected to each other through a flexible part, thereby maintaining free deformations of each piezoelectric-element coupling plate. A pair of piezoelectric-element coupling plates may serve as an electrode that applies voltage to the piezoelectric elements, thereby contributing to easier manufacture and cost reduction in comparison with a structure in which an additional electrode plate is formed as a separate member from a base.

Each pair of piezoelectric-element coupling plates may expose part of the shear type piezoelectric element, and an exposed part of the piezoelectric element may be wire-connected to a junction part with a wire pattern for driving the arm. Thereby, the wire pattern controls both driving of the arm and fine positioning of the suspension.

An actuator and a disc drive according to other aspects of the present invention include the above fine tracking mechanism, and exhibit the operations of the above tracking mechanism. The reduced distribution of the suspension's attachment tolerance would be helpful particularly when the disc drive drives plural discs. This is because when the suspension's attachment tolerance becomes larger than the design value, it becomes difficult to accommodate a predetermined number of discs in the disc drive having a predetermined thickness.

Other objects and further features of the present invention will become readily apparent from the following description of the embodiments with reference to accompanying drawings.

DETAILED DESCRIPTION OF THE INVENTION

Figure 1:
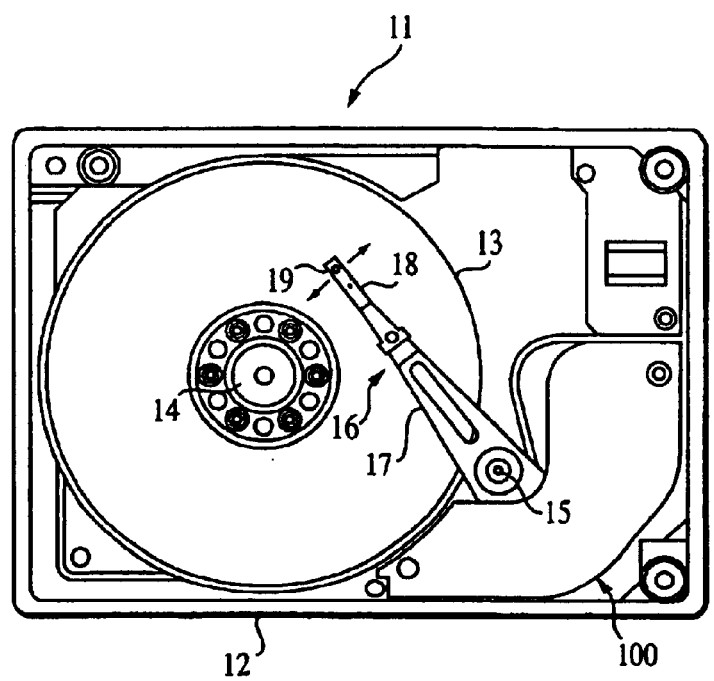
FIG. 1 is a plan view showing an internal structure of a hard disc drive as one example of the present invention.

Referring now to accompanying drawings, a description will be given of an HDD 11 as one embodiment according to the present invention. The HDD 11 includes, in a housing 12 as shown in FIG. 1, one or more magnetic disc(s) 13 as a data medium or record carrier, a spindle motor 14, and a magnetic head part. Here, FIG. 1 is a plan view showing an internal structure of the HDD 11.

The housing can be made, for example, of aluminum die casting or stainless steel, and has a rectangular parallelepiped shape to which a cover (not shown) is coupled so as to seal its internal space. Each magnetic disc 13 in this embodiment has high recording density, as high as 100 Gb/in$^2$ or even higher, and is mounted on a spindle of the spindle motor 14.

The spindle motor 14 rotates the magnetic disc 13 at a high speed, such as 7,200 rpm and 10,000 rpm, and includes a brushless DC motor (not shown) and a spindle as its rotor part. For example, when two magnetic discs 13 are used, a disc, a spacer, a disc, and a clamp are stacked in this order on the spindle, and fixed by a bolt engaged with the spindle. Unlike this embodiment, the magnetic disc 13 may be a disc having a hub without a center hole, and the spindle rotates the disc through the hub.

The magnetic head part includes a slider 19, and an actuator 100 that serves as a mechanism for positioning and driving the slider 19.

Figure 2:
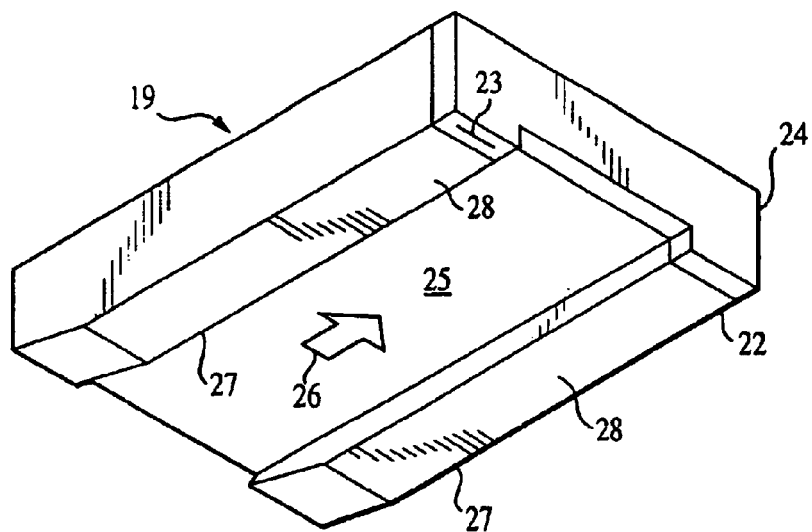
FIG. 2. is an enlarged perspective view of a slider of the hard disc drive shown in FIG. 1.

The slider 19 includes, as shown in FIG. 2, a slider body 22 having an approximately rectangular parallelepiped shape made of $Al_2O_3$—TiC (altic), and a head-device built-in film 24 secured at an air outflow end of the slider body 22 and made of $Al_2O_3$ (alumina), the film 24 including a built-in read/write head 23. Here, FIG. 2 is an enlarged perspective view of the slider 19. The slider body 22 and head-device built-in film 24 define a floatation surface 25 as a surface opposite to a carrier, i.e., the magnetic disc 13, which surface 25 catches air current 26 generated from the rotating magnetic disc 13.

A pair of rails 27 are formed on the floatation surface 25, extending from an air inflow end to the air outflow end. A so-called air-bearing surface (referred to as "ABS" hereinafter) 28 is defined at a top (i.e., outer) surface of each rail 27. The buoyancy is generated at the ABS 28 by the air current 26. The head 23 embedded in the head-device built-in film 24 is exposed at the ABS 28. The floatation system of the slider 19 is not limited to this form, but may use a known dynamic pressure lubricating system, a known static pressure lubricating system, a known piezoelectric control system, and any other known floatation system. Unlike the instant embodiment, which uses a contact start stop system in which the slider 19 contacts the disc 13 at the time of stop, the slider 19 may be lifted up over the disc 13 before the disc 13 stops, held at a holding part (sometimes referred to as a ramp) located outside the disc 13 so as to hold the slider 19 in a non-contact manner with the disc 13, and dropped from the holding part over the disc 13 so as to hold the slider 19 in a non-contact manner with the disc 13, and dropped from the holding part over the disc 13 when the disc 13 runs, as in the dynamic or ramp loading system.

The head 23 includes a magnetoresistive/inductive composite head including an inductive head device for writing binary information into the magnetic disc 13 using a magnetic field induced by a conductive coil pattern (not shown), and a magnetoresistive ("MR" hereinafter) head device for reading resistance as binary information changing according to a magnetic field generated by the magnetic disc 13. The MR head device may use any type, such as a giant magnetoresistive ("GMR") type including both a Current in Plane ("CIP") structure and a Current Perpendicular to Plane ("CPP") structure, a tunneling magnetoresistive type ("TMR"), and an anisotropic magnetoresistive ("AMR") type.

Figure 3A:
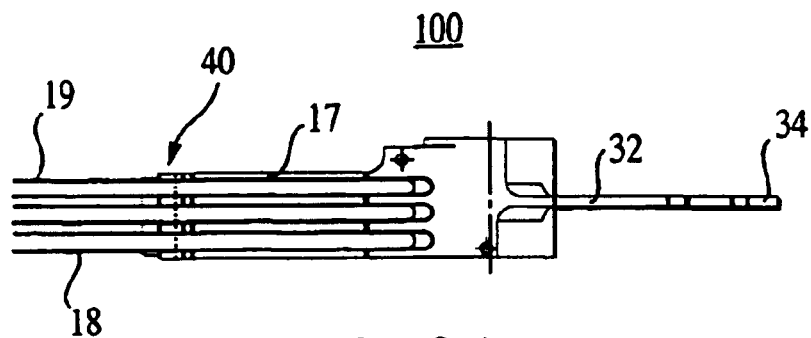
FIGS. 3A–3C are a left side view, a plan view and a right side view, respectively, of a detailed structure of the actuator shown in FIG. 1.
Figure 3B:
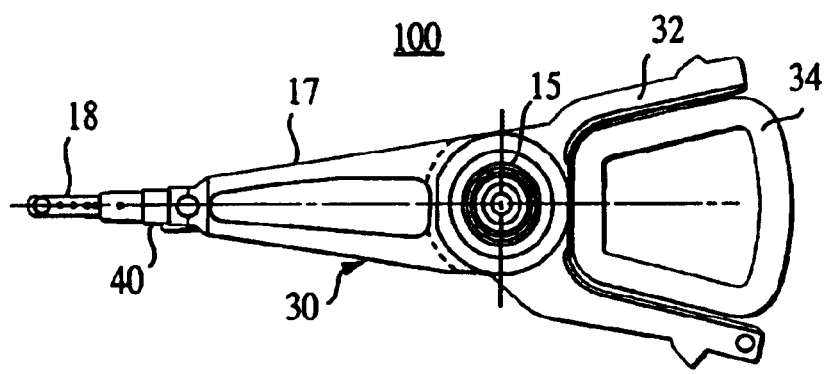
Figure 3C:
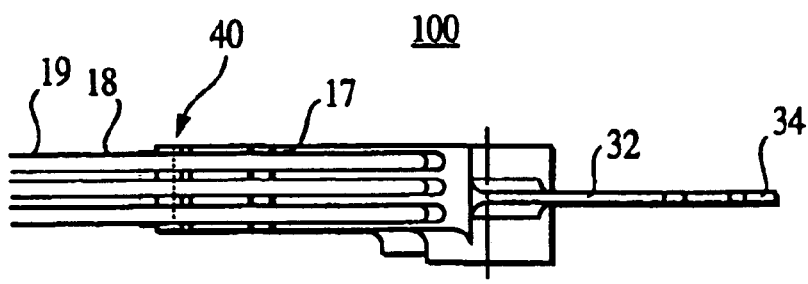

Turning back to FIG. 1, the actuator 100 includes a voice coil motor (not shown in FIG. 1), a support shaft 15, and a carriage 16. FIGS. 3A–3C show details of an actuator 100: FIGS. 3A–3C are a left side view, a plan view, and a right side view, respectively, of the actuator 100. As illustrated herein, the actuator 100 drives six sliders 19 for recording data into and reproducing data from both sides of three discs 13, but the number of discs 13 is not limited to three, as discussed above.

The voice coil motor includes a flat coil 34 between two yokes 32 at one side with respect to the support shaft 15. The flat coil 34 is provided opposite to a magnetic circuit (not shown) provided in the housing 12 of the HDD 11, and actuator 100 swings in accordance with a current value flowing in the flat coil 34. The magnetic circuit includes, for example, a permanent magnet fixed onto an iron plate fixed in the housing 12, and a mobile magnet fixed onto the carriage 16. The support shaft 15 is inserted into a cylindrical hollow hole in the carriage 16, and arranged such that it extends perpendicular to the paper surface in FIG. 1 in the housing 12.

The carriage 16 includes plural (e.g., four) rigid arms 17 each operable rotatably or swingably around the support shaft 15, plural (e.g., six) suspensions 18 each of which is attached to a tip of the corresponding arm 17 and extends forward from the arm 17, and plural (e.g., four) bases 41 each of which connects the suspension 18 to the arm 17. The base 41 constitutes a fine tracking mechanism 40 which will he described with reference to FIGS. 4A and 4B.

Figure 4A:
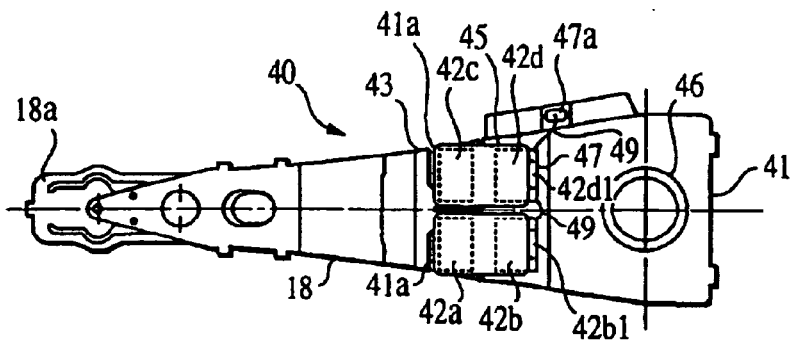
FIGS. 4A and 4B are a plan view and a side view, respectively, of the minutely moving mechanism shown in FIGS. 3A–3C.

One or two suspensions 18 are attached to a tip of each arm 17. The arm 17 has a pectinate shape viewed from a side at one side with respect to the support shaft 15. The suspension 18 can be, for example, a Watlas type suspension made of stainless steel, which uses a gimbal spring (not shown) to cantilever the slider 19. The suspension 18 also supports a wiring part 18a connected to the slider 19 through a lead, etc. The wiring part 18a is depicted in FIGS. 4A, which will be described later. The sense current, read-in data, and read-out data are supplied and output between the head 23 and the wiring part 18a through such a lead. The wiring part 18a is connected to a junction flexible printed circuit ("FPC") board 30.

The suspension 18 applies an elastic force to the slider 19 against a surface of the magnetic disc 13. As described later, the instant embodiment reduces the attachment tolerance of the suspension 18 to a surface of the arm 17 as compared with prior art structures, and thus the dispersed elastic force which the suspension 18 applies to the slider 19 is almost always within a permissible design range. In addition, as described later, the flatness of each of the suspension 18 and the slider 19 is improved in comparison with the prior art structures, thereby preventing head crash and lowered positioning accuracy under excessive elastic force and torsion.

Figure 4B:
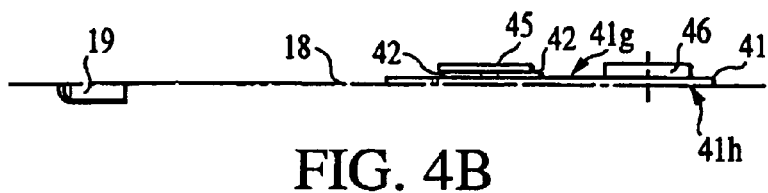
Figure 5A:
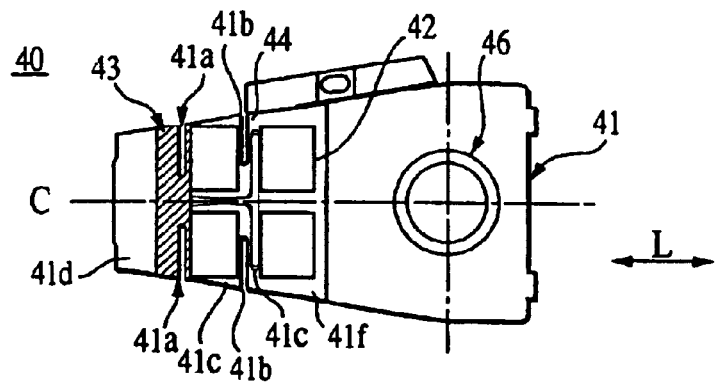
FIGS. 5A and 5B are a plan view and a side view, respectively, of the minutely moving mechanism shown in FIGS. 3A–3C.
Figure 5B:
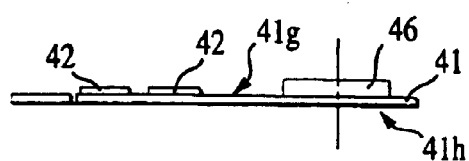

A description will now be given of the fine tracking mechanism 40 for the actuator 100, with reference to FIGS. 4A to 5B. Here FIG. 4A is an enlarged plan view of the fine tracking mecahanism 40 for the actuator 100, and FIG. 4B is a schematic side view of FIG. 4A. FIG. 5A is an enlarged plan view of the base 41 shown in FIGS. 4A and 4B, and FIG. 5B is a schematic side view of FIG. 5A.

The fine tracking mechanism 40 provides a fine adjustment when the head 23 is in an on-track state, as well as a quick seek in cooperation with the voice coil motor during the seek time. The mechanism 40 for the head 23 or suspension 18 is provided between each suspension 18 and each arm 17, and provides a mechanism for moving the suspension 18 independent of swinging of the actuator 100 around the support shaft 15.

The fine adjustment mechanism 40 includes the base 41, two pairs of piezoelectric elements 42a–42d (which are generalized by reference numeral 42), an insulating layer 43, a conductive layer 44, a piezoelectric-element coupling plate 45, a caulking part 46, and a connecting part 47.

The base 41 is fixed onto the arm 17, which swings around the support shaft 15, and the suspension 18 which supports the slider 19. The base 41 connects the suspension 18 to the arm 17. The base 41 is fixed onto the arm 17 viaacaulking part 46. The base 41 has slits 41a–41c, as shown in FIG. 5A in which the piezoelectric-element coupling plate 45 is removed from FIG. 4A. The slits 41a and 41c are formed in a direction perpendicular to a longitudinal direction L of the base 41, near a centerline C in the base 41, while the slit 41b forms a T shape symmetrical with respect to the centerline C. As a result, the slits 41a–41c allow the base 41 to include a mobile part 41d which secures the suspension 18 and may move minutely with the suspension 18, a mobile part 41e which mounts piezoelectric elements 42a and 42c at the side of the mobile part 41d, and a fixed part 41f which is connected to the arm 17 side and mounts the piezoelectric elements 42b and 42d. The mobile parts 41d and 41e are movable relative to the fixed part 41f.

In this way, the base 41 of this embodiment has the mobile part 41d that may finely move the suspension 18, and serves as a conventional hinge plate. When the hinge plate is inserted between the base 41 and the suspension 18, the attachment tolerance of the suspension 18 is affected by the hinge plate's dimension tolerance, but the instant embodiment removes the hinge plate between the base 41 and the suspension 18 and reduces the dispersion of the attachment tolerance of the suspension 18 in comparison with a structure in which the hinge plate is located between them. Thereby, as shown in FIG. 3A, the HDD 11 may accommodate plural discs 13. When the suspension's attachment tolerance exceeds a design value, it becomes difficult to accommodate a predetermined number of discs 13 in the disc drive having a predetermined thickness. Therefore, the reduced attachment tolerance of the suspension would be helpful particularly when the HDD 11 drives a plurality of discs. In addition, the reduced distribution in the suspension's attachment tolerance means that the suspension may be attached with precision closer to a design value. Therefore, the elastic force, for example, as seen in a contact start stop system where the suspension 18 applies a preset elastic force to the disc 13, comes close to the design value, preventing head crash and improving positioning accuracy. Moreover, the base 41 that serves as a hinge plate contributes to the reduced number of components, low profile, and cost reduction of the fine positioning mechanism 40.

The piezoelectric element 42 is a shear type piezoelectric element that is polarized in a direction orthogonal to its thickness direction, and deforms its top and bottom surfaces perpendicular to the thickness direction when voltage is applied to the piezoelectric element 42 in the thickness direction. The shear type piezoelectric element shears or sliding deformation when voltage is applied to its top and bottom surfaces. Therefore, when voltage is applied while one electrode is mounted, for example, on a bottom surface and the other electrode is mounted, for example, on a top surface, it deforms in the polarization direction. The piezoelectric element 42 is provided on the base 41, and deforms the mobile parts 41d and 41e in the base 41 through the slits 41a–41c. A Cu/Ar film is formed through sputtering at the top and bottom surfaces of the piezoelectric element 42.

The piezoelectric element 42 is provided at one surface 41g on the base 41, while the suspension 18 is provided at another surface 41h on the base 41 opposite to the surface 41g. When the piezoelectric element 42 is inserted between the base 41 and the suspension 18, the attachment tolerance of the suspension 18 is subject to the dimension tolerance of the piezoelectric element, but the instant embodiment does not insert a piezoelectric element between the base 41 and the suspension 18 as in the prior art structure, reducing the accumulation of attachment tolerances of the suspension 18 in comparison with a structure that interposes the piezoelectric element. This structure provides the same effect as the above structure that does not interpose the piezoelectric element; the instant embodiment enhances the effect by interposing neither the hinge plate nor the piezoelectric element. As a consequence, the attachment tolerance of the suspension 18 to the arm 17's surface depends only upon the thickness tolerance and the flatness of the base 41, and is not affected by dimensions of the piezoelectric element 42 or any other component (e.g., the piezoelectric-element coupling plate 45) (which is coupled with a top side shown in FIG. 4B) of the piezoelectric element 42.

Figure 6A:
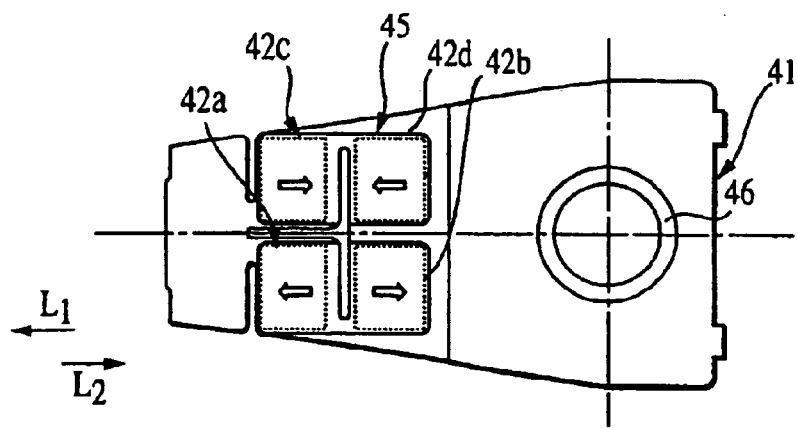
FIGS. 6A–6C are a plan view, a side view, and a sectional view, respectively, for explaining a principle of an increased stroke of the minutely moving mechanism shown in FIGS. 3A–3C.
Figure 6B:
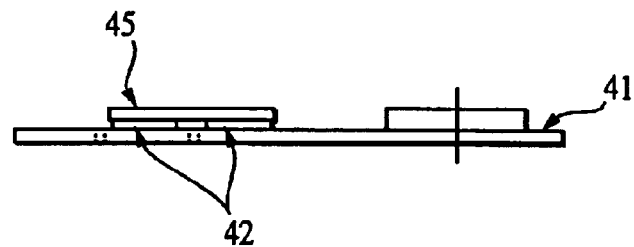
Figure 6C:
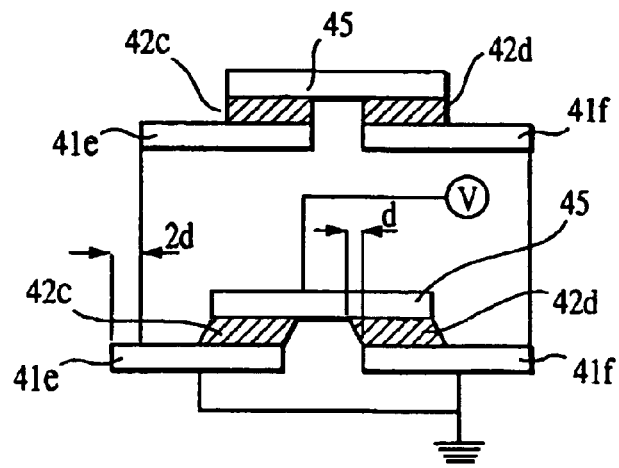

Next follows a description of how the stroke is increased by the fine positioning mechanism 40, with reference to FIG. 6. Here, FIGS. 6A–6C are a plan view, a schematic side view, and a schematic sectional view, respectively, for explaining a principle of the increased stroke of the mechanism 40. The arrangement of slits in FIGS. 6A–6C is the same as that in FIGS. 8A and 8B, but may be the same as that shown in FIGS. 5A and 5B.

As show in FIG. 6A, four piezoelectric elements 42a–42d are provided on the base 41: the piezoelectric elements 42a and 42c are provided at a side of the mobile part 41e, while piezoelectric elements 42b and 42d are provided at a side of the fixed part 41f. The piezoelectric element 42 may be provided at only one side (for example, 42a and 42b). Each piezoelectric element 42 may have a different size, but preferably exhibits a symmetrical deformation with respect to the centerline C. Therefore, the piezoelectric element at the side of the mobile part 41e and the piezoelectric element at the side of the fixed part 41f may have different sizes.

Theoretically, the present invention may use an unrestricted number of piezoelectric elements 42 according to the length of the movement or strokes to be maintained, but the instant embodiment adopts four piezoelectric elements as a typical example in the HDD 11. Although the total number of piezoelectric elements 42 is not limited to four, an even number, such as a multiple of four, is preferable. As described above, the slits 41a–41c are formed in the base 41 so as to divide the base 41 into the mobile part 41d that is fixed onto the suspension 18 and exhibits swing actions, the part (or mobile part 41e) that mounts the piezoelectric elements 42a and 42c at the mobile part 41a side and the piezoelectric-element mounting part 41f at the fixed side. These slits 41a–41c serve to enhance the movement of the piezoelectric element 42, and move the suspension 18 smoothly.

The piezoelectric element 42 has been polarized in an arrow direction in advance as shown in FIG. 6A: the piezoelectric elements 42a and 42d have been polarized in a direction $L_1$, while the piezoelectric elements 42b and 42c have been polarized in a direction $L_2$. The piezoelectric elements 42a and 42b form a pair, while the piezoelectric elements 42c and 42d form a pair. Therefore, the piezoelectric elements 42 have opposite polarization directions in each pair.

Referring now to FIG. 5A, the piezoelectric element 42 is formed, through an insulating layer 43, on the conductive layer 44 that serves as an electrode for the piezoelectric element 42. In the instant embodiment, the base 41 is made of stainless steel. The insulating layer 43 is made of polyimide, and a film with a thickness of 10 μm is formed on the base 41. The conductive layer 44 has a thickness, for example, of 5 μm. The piezoelectric-element coupling plate 45 also serves as an electrode. As a result, voltage is applied to the piezoelectric element 42 between the conductive layer 44 and the piezoelectric-element coupling plate 45. The instant embodiment thus forms the conductive layer 44 as a direct electrode on the base 41. The piezoelectric-element coupling plate 45 serves as an electrode, and is made of stainless steel. The conventional structure interposes an electrode plate between the base 41 and the suspension 18 in addition to the piezoelectric element, but attachment tolerance of the suspension 18 is reduced even in the conventional structure where another member serves as an electrode instead of providing an electrode plate as an independent member. Although the instant embodiment forms a film of the insulating layer 43 and conductive layer 44 on the stainless base 41, a member having the insulating layer 43 and conductive layer 44 may be bonded.

The piezoelectric element 42 operates when voltage is applied between the conductive layer 44 and a pair of piezoelectric-element coupling plates 45. FIG. 6C shows actions of a pair of piezoelectric elements 42c and 42d: The top in FIG. 6C shows a state before the voltage is applied, and the bottom in FIG. 6C shows a state after the voltage is applied. As illustrated, only when the voltage is applied between the base 41 and the piezoelectric-element coupling plate 45, the piezoelectric elements 42c and 42d, which have been polarized in reverse directions in advance, shear (or exhibit sliding deformation) in reverse directions to each other. Thereby, the deformed amount at the side of the mobile part 41e becomes doubled by the deformed amount 2d in comparison with the deformed amount d of one piezoelectric element. Therefore, the instant embodiment may enlarge the stroke without increasing the thickness of the mechanism 40.

In other words, as the bottom surface of the piezoelectric element 42d is fixed onto the fixed part 41f in FIG. 6C, the top surface of the piezoelectric element 42d deforms by d. The deformed amount d moves the piezoelectric-element coupling plate 45 to the left side, consequently deforming the piezoelectric element 42c and the mobile part 41e. In addition, the piezoelectric element 42c itself deforms with the mobile part 41e to the left side by the deformed amount d due to its own deformation. At this time, since the top surface of the piezoelectric element 42c is fixed by the piezoelectric-element coupling plate 45 in the right direction, the bottom surface of the piezoelectric element 42c moves with the mobile part 41e to the left side. In this way, the piezoelectric-element coupling plate 45 serves to transmit the deformation of the piezoelectric element 42 at the fixed part 41f side to the mobile part 41e side, as well as fixing the top surface of the piezoelectric elements 42c and 42d in the same manner.

The piezoelectric-element coupling plate 45 has an approximately rectangular shape, and partially exposes the piezoelectric elements 42b and 42d in FIG. 4. The piezoelectric elements 42b and 42d are wire-bonded to each other through a wire 49, and the piezoelectric element 42d is connected to the terminal 47a on the connection part 47. The exposed part of the piezoelectric element 42 is covered with an Au film that facilitates wire bonding, and the wire bonding becomes easier as the thickness increases. The wire is coated with resin so as not to be vibrated and damaged by wind or any other exiting force in the HDD 11. The terminal 47a is connected to a wiring pattern that drives the arm 17 around the support shaft 15. The current applied to the piezoelectric elements 42d and 42b through the wire bonding is supplied to the piezoelectric elements 42a and 42c via the piezoelectric-element coupling plate 45. Thereby, the wiring pattern may control minute driving of the suspension 18 as well as the driving of the arm 17. The wiring pattern is formed, for example, in the control part 71 in a control system 70, which will be described later.

Figure 7A:
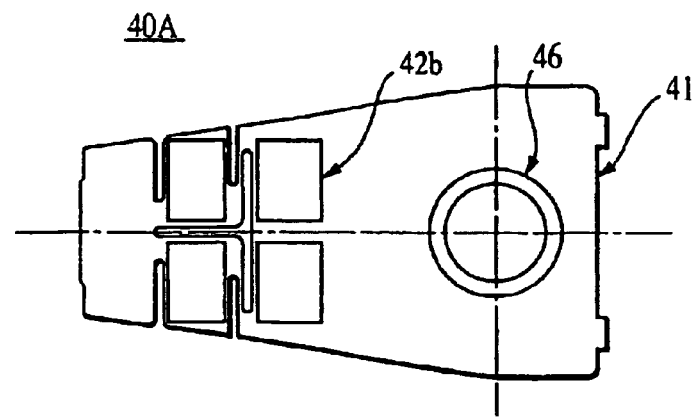
FIGS. 7A and 7B are a plan view and a side view showing a variation of the minutely moving mechanism shown in FIGS. 5A and 5B.
Figure 7B:

FIGS. 7A and 7B show a mechanism 40A as a variation of the mechanism 40 shown in FIGS. 5A and 5B. Here, FIG. 7A is a schematic plan view showing the mechanism 40A near the base 41, and FIG. 7B is a schematic sectional view of FIG. 7A. The mechanism 40A has the base 41, piezoelectric element 42, and piezoelectric-element coupling plate 45 (not shown), but is different from the mechanism 40 in that it does not have the insulating layer 43 and the conductive layer 44. The piezoelectric element 42 is bonded to the base 41, and the base 41 is kept electrically grounded. Therefore, a desired voltage may be applied to the piezoelectric-element coupling plate 45 in the mechanism 40A. The mechanism 40A does not require a formation of the insulating and conductive layers, facilitating manufacture and cost reduction.

Figure 8A:
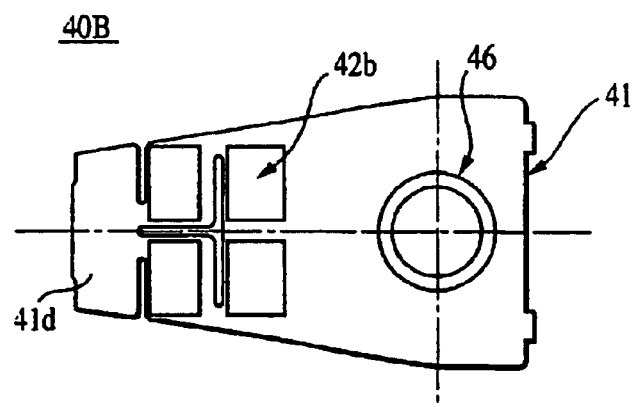
FIGS. 8A and 8B are a plan view and a side view showing another variation of the minutely moving mechanism shown in FIGS. 5A and 5B.
Figure 8B:
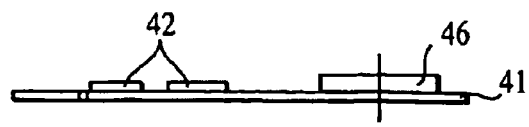

FIGS. 8A and 8B show a mechanism 40B as a variation of the mechanism 40 shown in FIGS. 5A and 5B. Here, FIG. 8A is a schematic plan view showing the mechanism 40B near the base 41, and FIG. 8B is a schematic sectional view of FIG. 8A. The mechanism 40B has the slits 41a and 41c of FIG. 5A, but is different from the mechanism 40 in that it does not have the slit 41b. In this way, shapes and arrangement of the slits are not limited to those shown in FIGS. 5A and 5B. The slits among the piezoelectric elements 42 attempt to integrally form the base 41 and the part 41d to be fixed onto the suspension 18, and thus are designed to have proper shapes so as not to prevent relative movement of the piezoelectric elements 42.

Figure 9A:
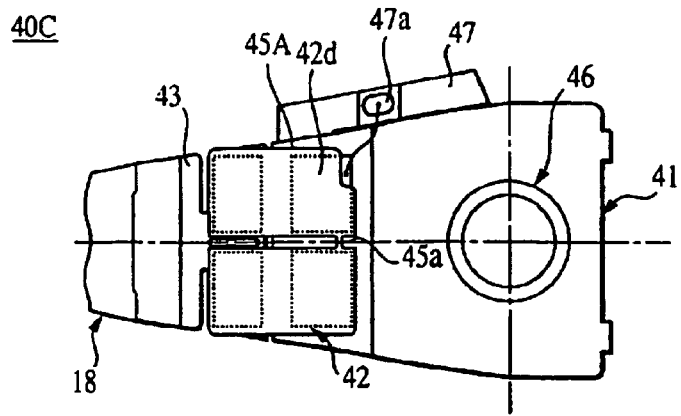
FIGS. 9A and 9B are a plan view and a side view showing still another variation of the minutely moving mechanism shown in FIGS. 5A and 5B.
Figure 9B:

FIGS. 9A and 9B show a mechanism 40C as a variation of the mechanism 40 shown in FIGS. 5A and 5B. Here, FIG. 9A is a schematic plan view showing the mechanism 40C near the base 41, and FIG. 9B is a schematic sectional view of FIG. 9A. The mechanism 40C is different form the mechanism 40 in that it has the piezoelectric-element coupling plate 45A coupled by flexible part 45a instead of the piezoelectric-element coupling plate 45. The piezoelectric-element coupling plate 45A is a partially notched shape from a rectangle such that only the piezoelectric element 42d is partially exposed, and the piezoelectric element 42d is wire-bonded to a terminal 47a on the connection part 47. Thus, such a connected piezoelectric-element coupling plate 45 reduces the number of wire bondings in comparison with the structure shown in FIGS. 5A and 5B. Since each pair of piezoelectric elements 42 relatively deform, the wire bonding preferably has sufficiently low rigidity so as no to restrain their deformations. In addition, it is easier to manufacture the structure shown in FIGS. 9A and 9B than to manufacture the wire bonding structure shown in FIGS. 5A and 5B.

Figure 10:
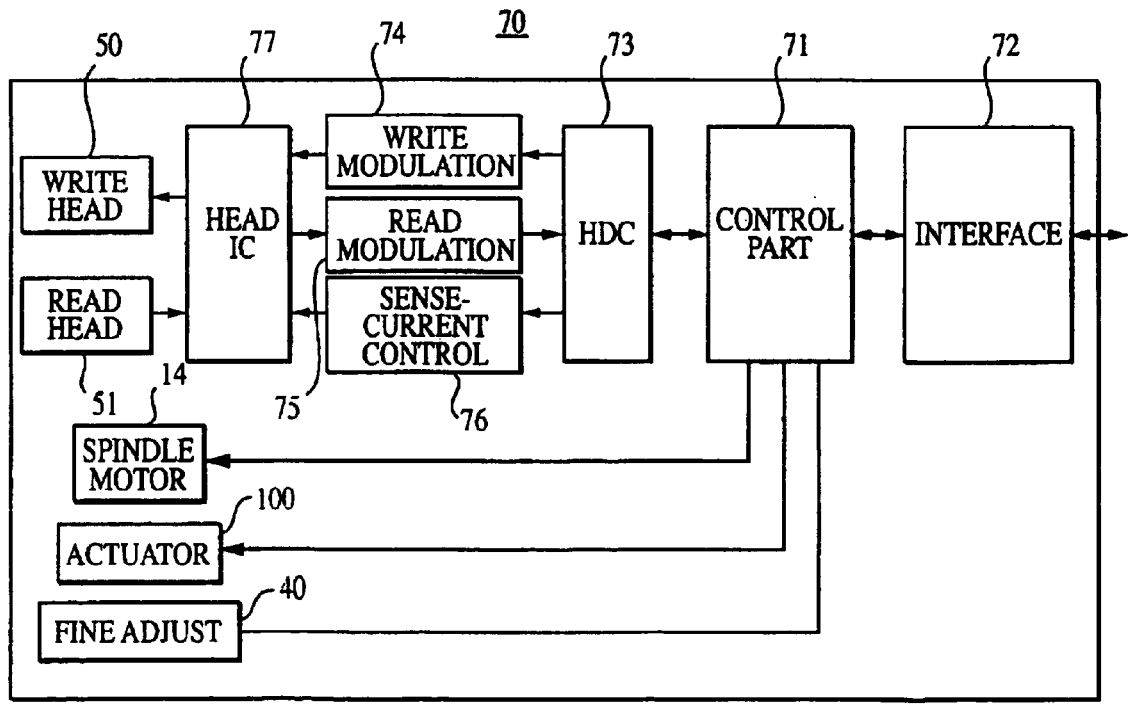
FIG. 10 is a block diagram for explaining a control system in the hard disc drive shown in FIG. 1.

FIG. 10 shows a control block diagram of a control system 70 in the HDD 11. The control system 70, which may be implemented as a control board, etc. in the HDD 11, includes a control part 71, an interface 72, a hard disc controller (referred to as "HDC" hereinafter) 73, a write modulation part 74, a read demodulation part 75, a sense-current control part 76, and a head IC 77. Of course, they are not necessarily arranged as one member; for example, only the head IC 77 is connected to the carriage 16.

The control part 71 covers any processor such as a CPU and MPU irrespective of its name, and controls each part in the control system 70. The interface 72 connects the HDD 11 to an external apparatus, such as a personal computer ("PC" hereinafter) as a host. The HDC 73 sends to the control part 71 data that has been demodulated by the read demodulation part 75, sends data to the write modulation part 74, and sends to the sense-current control part 76 a current value as set by the control part 71. Although FIG. 10 shows that the control part 71 achieves servo control over the spindle motor 14 and (a motor in) the actuator 100, the HDC 73 may serve as such servo control.

The write modulation part 74 modulates data and supplies data to the head IC 77, which data has been supplied from the host through the interface 72 and is to be written down onto the disc 13 by an inductive head 50. The read demodulation part 75 demodulates data into an original signal by sampling data read from the disc 13 by an MR head device 51. The write modulation part 74 and read demodulation part 75 may be recognized as one signal processing part. The head IC 77 serves as a preamplifier. Each part may apply any structure known in the art, and a detailed description thereof will be omitted.

In operation of the HDD 11, the control part 71 drives the spindle motor 14 and rotates the disc 13. The airflow associated with the rotation of the disc 13 is introduced between the disc 13 and slider 19, forming a minute air film and thus generating the buoyancy that enables the slider 19 to float over the disc surface. The suspension applies the elastic pressure onto the slider 19 in a direction against the buoyancy of the slider 19. The balance between the buoyancy and the elastic force spaces the slider 19 from the disc 13 by a constant distance. As discussed above, the elastic pressure applied by the suspension 18 is close to the designed value, preventing crashing.

The control part 71 then controls the actuator 100 and rotates the carriage 16 around the support shaft 15 and makes the fine positioning mechanism 40 swing for head 23's seek for a target track on the disc 13. The instant embodiment thus uses a swing arm type in which the slider 19 draws an arc locus around the support shaft 15, but the present invention is applicable to a linear type in which the slider 19 is a linear locus.

Initially, the control part 71 controls driving of the arm 17 around the support shaft 15 to perform a rough seek. Next, the control part 71 performs a fine seek so as to correct overshoot resulting from the rough seek by controlling voltage applied to the piezoelectric element 42 in the mechanism 40. The large stroke in the mechanism 40 is effective to save time necessary for settling and quicken the settling at the time of seek. In addition, the large stroke presents high resistance to disturbance, such as external vibrations. If necessary, unlike the instant embodiment that doubles the stroke, the stroke may be made 1.5 times as large to save power.

When voltage corresponding to the deformed amount that has been determined by the control part 71 is applied to the terminal 47a in the connection part 47, the mechanism 40 in FIGS. 5A and 5B uses wire bonding to apply the voltage to the piezoelectric elements 42d and 42b. On the other hand, the mechanism 40C in FIGS. 9A and 9B uses wire bonding to apply the voltage to the piezoelectric element 42d and then to the piezoelectric element 42a–42c through the piezoelectric-element coupling plate 45.

When the voltage is applied to the piezoelectric element 42, the piezoelectric elements 42a and 42b deform such that they are separated from each other while the piezoelectric elements 42c and 42d deform such that they approach each other, as shown in FIG. 6A. As a result, in FIGS. 5A and 5B, the mobile part 41e deforms and then the mobile part 41f deforms. Thereby the suspension 18 minutely moves and positions the slider 19 at a desired track.

Although the arm 17 must be moved for movement outside the stroke range of the mechanism 40, the mechanism 40 of the instant embodiment has a more increased stroke than conventional structures and thus is advantageous for quick positioning because of the reduced number of moving times of the arm 17. In addition, as described above, the mechanism 40 exhibits high positioning accuracy, since the suspension 18 does not become inclined when the piezoelectric-element coupling plate 45 inclines relative to the surface 41g on the base 41.

In a write time, the control part 71 receives data from the host such as a PC (not shown) through the interface 72, selects the inductive head device, and sends data to the write modulation part 74 through the HDC 73. In response, the write modulation 74 modulates the data, and sends the modulated data to the head IC 77. The head IC 77 amplifies the modulated data, and then supplies the data as write current to the inductive head device. Thereby, the inductive head device writes down the data onto the target track.

In a read time, the control part 71 selects the MR head device, and sends the predetermined sense current to the sense-current control part 76 through the HDC 73. In response, the sense-current control part 76 supplies the sense current to the MR head device through the head IC 77. Thereby, the MR head reads desired data from the desired track on the disc 13. Data is amplified by the head IC 77 based on the electric resistance of the MR head device varying according to a signal magnetic field, and is then supplied to the read demodulation part 75 to be demodulated to an original signal. The demodulated signal is sent to the host (not shown) through the HDC 73, controller 71, and interface 72.

Further, the present invention is not limited to these preferred embodiments, and various modifications and changes may be made in the present invention without departing from the spirit and scope thereof. Although the instant embodiments refer to a HDD, the present invention is applicable to any type of disc drive (such as an optical disc drive).

One aspect of the present invention reduces the number of components between the base and suspension, and may provide the head moving mechanism in which the suspension's attachment tolerance does not vary so widely. As a result, the elastic force which the suspension applies to the disc becomes close to the designed value, preventing crash and lowered positioning accuracy. Another aspect of the present invention may provide a head moving mechanism having a double stroke. This structure consequently provides quick positioning and fast settling without swinging the arm. The large stroke presents high resistance to disturbance, such as external vibrations, because the large stroke allows the mechanism to cancel large forces placed on the head by such disturbances.

What is claimed is:

1. A mechanism, provided in a disc drive, for driving a head that records data onto and reproduces data from a disc, said mechanism comprising:
   a base fixed to an arm and a suspension, the base connecting the suspension to the arm, the arm swinging around a rotary shaft, and the suspension supporting the head; and
   a drive part, located adjacent the base, for deforming said base, said drive part including a shear type piezoelectric element that is polarized in a direction orthogonal to a thickness direction of the piezoelectric element, and deforms top and bottom surfaces of the piezoelectric element perpendicular to the thickness direction when voltage is applied to the piezoelectric element in the thickness direction.

2. A mechanism according to claim 1, wherein said drive part is provided at a first side of said base, and the suspension is provided at a second side of said base opposite to the first side.

3. A mechanism according to claim 1, wherein said base is parted into a fixed side and a mobile side, the fixed side being fixed relative to the arm, and the mobile side being deformable relative to the fixed side,
   wherein said mechanism further comprises:
   two pairs of shear type piezoelectric elements for moving the suspension, one piezoelectric element in each pair being provided on the fixed side of said base, and the other in each pair being provided on the mobile side of said base; and
   a pair of piezoelectric-element coupling plates that connects two shear type piezoelectric elements in each pair of elements to each other.

4. A mechanism, provided in a disc drive, for driving a head that records data onto and reproduces data from a disc, said mechanism comprising:
  a base that connects a suspension to an arm, the suspension supporting the head, and the arm swinging around a rotary shaft;
  two pairs of shear type piezoelectric elements for moving the suspension, the shear type piezoelectric elements being polarized in a direction orthodonal to a thickness direction of the piezoelectric elements, and deforming top and bottom surfaces of the piezoelectric elements perpendicular to the thickness direction when voltage is applied to the piezoelectric elements in the thickness direction, each pair of shear type piezoelectric elements having a fixed piezoelectric element and a mobile piezoelectric element, and the fixed and mobile piezoelectric elements having opposite polarization directions; and
  a pair of piezoelectric-element coupling plates that connect two shear type piezoelectric elements in each pair of elements to each other.

5. A mechanism according the claim 4, wherein an electrode layer is formed on said base through an insulating layer, said electrode layer being used to apply voltage to said shear type piezoelectric elements.

6. A mechanism according to claim 4, wherein said base is grounded.

7. A mechanism according to claim 4, wherein said base is grounded, desired voltage is applied to said piezoelectric-element coupling plates, and two pairs of shear type piezoelectric elements are bonded onto said base.

8. A mechanism according to claim 4, wherein said pair of piezoelectric-element coupling plates are connected to each other through a flexible part.

9. A mechanism according to claim 4, wherein said pair of piezoelectric-element coupling plates serve as an electrode that applies voltage to said piezoelectric elements.

10. A mechanism according to claim 4, wherein each pair of piezoelectric-element coupling plates exposes part of the shear type piezoelectric elements, the exposed part being wire-connected to a junction part with a wire pattern for driving the arm.

11. A disc drive comprising;
  a head that records data onto and reproduces data from a disc;
  an arm that swings around a rotary shaft;
  a suspension that supports said head; and
  a mechanism for driving said head, said mechanism including:
  a base fixed to said arm and suspension and connecting said suspension to said arm; and
  a drive part, located above the base, for deforming said base, said drive part including a shear type piezoelectric element that is polarized in a direction orthogonal to a thickness direction of the piezoelectric element, and deforms top and bottom surfaces of the piezoelectric element perpendicular to the thickness direction when voltage is applied to the piezoelectric element in the thickness direction.

12. A disc drive according to claim 11, wherein there are provided plural discs in said disc drive.

13. A disc drive comprising:
  a head that records data onto and reproduces data from a disc;
  an arm that swings around a rotary shaft;
  a suspension that supports said head; and
  a mechanism for driving said head, said mechanism including:
  a base that connects the suspension to the arm;
  two pairs of shear type piezoelectric elements for moving the suspension, the shear type piezoelectric elements being polarized in a direction orthogonal to a thickness direction of the piezoelectric elements, and deforming top and bottom surfaces of the piezoelectric elements perpendicular to the thickness direction when voltage is applied to the piezoelectric elements in the thickness direction, each pair of shear type piezoelectric elements having a fixed piezoelectric element and a mobile piezoelectric element, and the fixed and mobile piezoelectric elements having opposite polarization directions; and
  a pair of piezoelectric-element coupling plates that connect the two shear type piezoelectric elements in each pair of elements to each other.

14. A disc drive according to claim 13, wherein there are provided plural discs in said disc drive.

* * * * *